No. 782,591. PATENTED FEB. 14, 1905.
P. H. BATTEN.
POWER INSTALLATION FOR SELF PROPELLED VEHICLES.
APPLICATION FILED SEPT. 23, 1904.
2 SHEETS—SHEET 1.
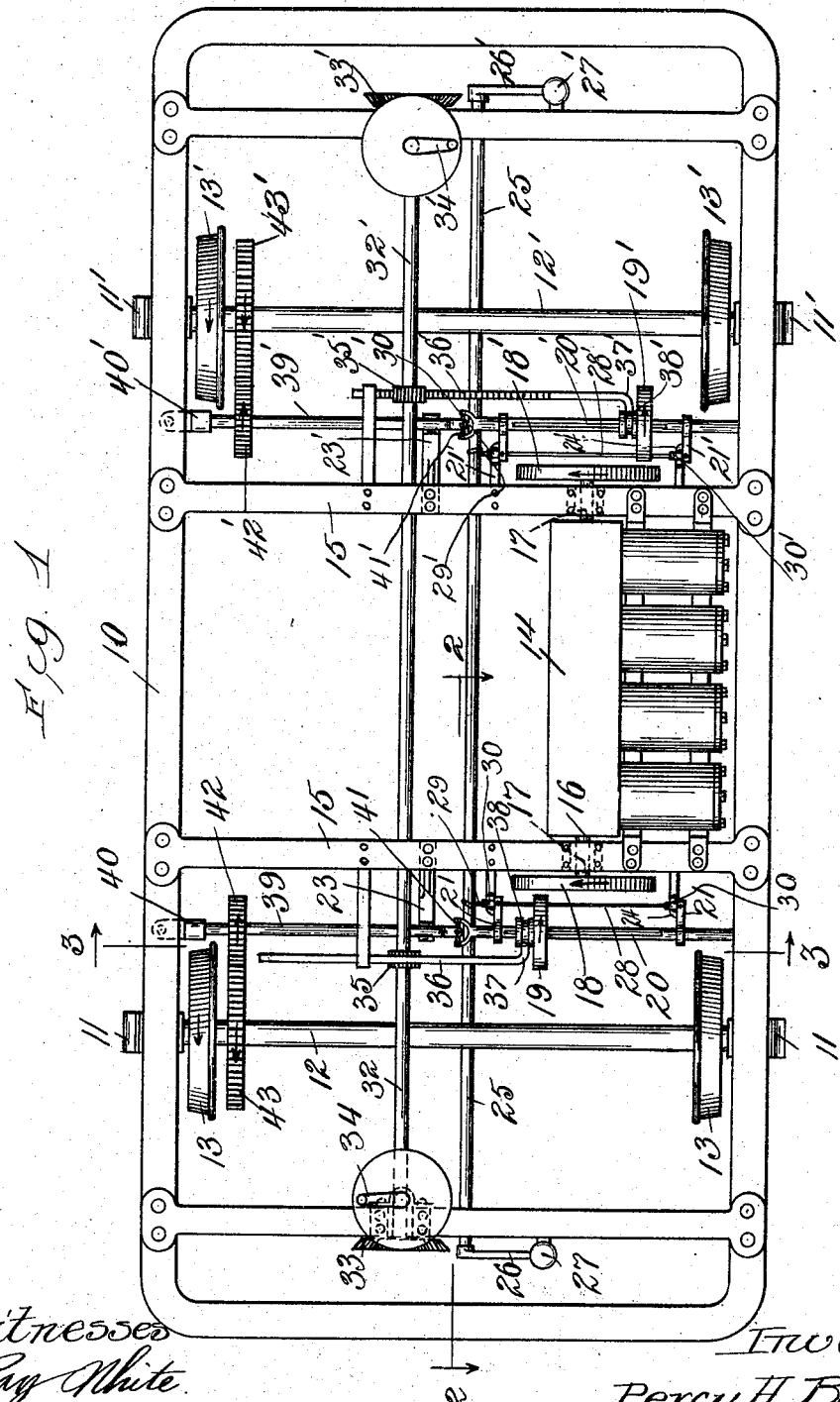
Witnesses
Ray White.
Harry R L White
Inventor:
Percy H. Batten
By Jorée Dain Atty.

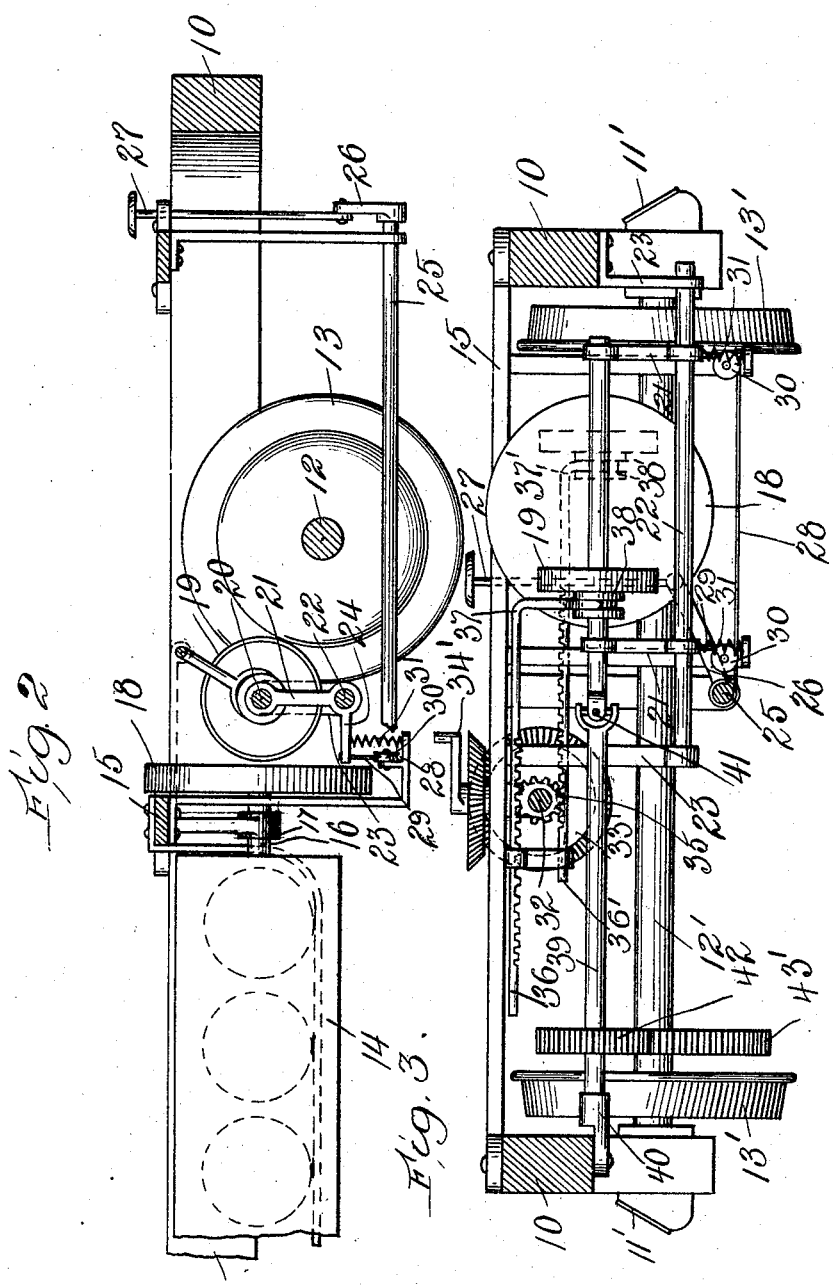

No. 782,591. Patented February 14, 1905.

UNITED STATES PATENT OFFICE.

PERCY H. BATTEN, OF CHICAGO, ILLINOIS.

POWER INSTALLATION FOR SELF-PROPELLED VEHICLES.

SPECIFICATION forming part of Letters Patent No. 782,591, dated February 14, 1905.

Application filed September 23, 1904. Serial No. 225,602.

*To all whom it may concern:*

Be it known that I, PERCY H. BATTEN, of Chicago, in the county of Cook and State of Illinois, have invented certain new and useful Improvements in Power Installation for Self-Propelled Vehicles; and I hereby declare that the following is a full, clear, and exact description thereof, reference being had to the accompanying drawings, which form part of this specification.

My invention relates to improvements in power installations for self-propelled vehicles, and is applicable to automobiles, street-cars, railways, and the like.

In the drawings, Figure 1 is a plan view of the frame and running-gear of a street-car equipped with a power installation embodying my invention. Fig. 2 is a fragmentary longitudinal section on line 2 2 of Fig. 1, and Fig. 3 is a transverse vertical section on line 3 3 of Fig. 1.

Throughout the drawings like numerals of reference refer always to like parts.

10 indicates in general the frame of a self-propelled vehicle, having at its opposite ends bearings 11 11 and 11' 11' for two axles 12 12', upon which are mounted the pairs of traction-wheels 13 13 and 13' 13'.

14 indicates in general a prime motor, preferably an explosive-engine, supported on suitable frame members 15 15 and preferably disposed toward one side of the frame 10, between the axles 12 12', about midway of the frame.

16 indicates the engine-shaft, preferably extending longitudinally of the frame and journaled in suitable bearings 17 17. On the engine-shaft I arrange means for providing two friction-surfaces facing in opposite directions, such surfaces being preferably supplied by two outwardly-facing disks 18 18', fixed on opposite ends of the shaft 16 and arranged transversely of the frame.

19 indicates a driven disk arranged in edge-to-face relation to the driving-disk 18 and splined on a transverse shaft 20 to slide longitudinally thereof and to rotate therewith. The shaft 20 is mounted for bodily movement transversely of its length toward and from the face of the driving-disk 18, and to this end the opposite ends of the shaft are mounted in rocking frames 21 21, pivoted upon a shaft 22, extending transversely of the car and suitably supported, as in brackets 23, said frames 21 having each a horizontal extension 24, which serves as a lever-arm to move the frame. Suitable means are provided for simultaneously oscillating the frames to move the driven disk 19 toward and from its driving-disk 18, such means being herein illustrated as a longitudinal rock-shaft 25, extending from end to end of the car, and at its end, at some suitable point, provided with a crank-arm 26, with which engages the treadle-lever 27, extending into suitable position for operation by the driver of the car.

28 indicates a cable secured to the shaft 25, having two branches 29 29 running over suitable idlers 30 30 and secured to the extremities of the lever-arms 24 24. The arrangement of the parts is such that when the treadle-lever 27 is depressed and the rock-shaft 25 rocked the rocking frame 21 is oscillated to bring the edge of the driven disk 19 into operative engagement with the surface of the driving-disk 18. This condition prevails as long as pressure is maintained upon the treadle-lever 27.

A spring 31 is provided in association with each of the lever-arms 24 of the rocking frames, tending to throw said frames in the reverse direction, so that as soon as pressure is removed from the lever 27 the driven disk is thrown out of engagement with the driving-disk.

Parts similar to those described are provided in conjunction with disk 18' and are similarly numbered and differentiated by the exponent character prime (').

Suitable means are provided for moving the driven disk 19 on its shaft 20 transversely of the face of the driven disk 18, and to this end I provide a longitudinal shaft 32, operatively associated, as by miter-gears 33, with the controlling-crank 34, arranged for operation by the driver of the car. The shaft 33 is provided with a pinion 35, with which meshes a rack 36, extending transversely of the car and having a fork 37 engaging with the grooved collar 38 of the driven disk 19. It will be apparent that by rotary motion of the lever 34 rotation is imparted to the shaft 32, and through the agency of the pinion 35 and the rack-bar 36 the driven disk is slid transversely of the face of the driving-disk.

The shaft 20 is operatively associated with one of the vehicle-wheels 13 to positively drive the same, and to this end I provide a tumble-shaft at one end supported in a bearing 40 for slight movement in any direction and at its opposite end connected by a universal joint 41 with the shaft 20. The tumble-shaft 39 carries a pinion 42, which meshes with the gear 43, carried by the axle 12 of the wheel 13.

The arrangement of parts at the other end of the car—that is to say, the association of parts with the driven disk 19'—is identical with that just described, like parts being indicated throughout by like numerals of reference differentiated by the exponent character prime ('). It is to be noted, however, that while the disk 19 is on one side of the axis of rotation of the driving-disk the driven disk 19' is upon the opposite side of its coacting driver, and it is further to be noted that while the rack-bar 36 of the disk 18 passes over its pinion 35 the rack-bar 36' of the driven disk 19' passes under its pinion 35', so that the movement of the disks 19 19' will be in opposite directions with respect to each other, but in like radial direction relative to their respective driving-disks. The connections of the driven disks with the traction-wheels of their respective ends of the vehicle are identical.

It will now be apparent that when the parts are in motion, assuming the direction of rotation of the driving-disk 18 18' to be that indicated by the arrows, the coacting rotary members will rotate in the directions indicated, respectively, by the arrows and both driving-wheels 13 and 13' be driven in like direction. The speed may be changed or the direction of progression reversed by operation of the controlling-lever 34 to shift the driven disks 19 19' transversely of their driving-disks, as heretofore described, and power may be applied to or released from the driving-wheels 13 13' by the manipulation of the treadle-lever 27, also as heretofore described.

While I have herein described in some detail an operative embodiment of my invention, I do not desire to be understood as limiting myself to the specific construction shown and described, as such construction is illustrative merely, and it will be apparent to those skilled in the art that numerous changes might be made in the specific embodiment of my invention without departing from its spirit and scope.

Having thus described my invention, what I claim, and desire to secure by Letters Patent of the United States, is—

1. The combination with a vehicle running-gear, comprising two independent traction-wheels, of an engine having a shaft, means on the engine-shaft providing two driving-surfaces, a driven disk arranged for edge-to-face contact with each driving-surface, and movable on a diametrical line across the axis of the driving-surface, means for so moving each driven disk, and operative connections between the driven disks and the respective traction-wheels.

2. The combination with a vehicle running-gear, comprising two independent traction-wheels, of an engine having a shaft, a driving-disk on each end of the engine-shaft, a driven disk for each driving-disk, the driven disks being disposed on opposite sides of the shaft-axis and arranged for edge-to-face contact with opposite faces of the driving-disks, each driven disk being movable diametrically across the axis of its driving-disk, and like connections as to direction of rotation between the two driven disks and the respective traction-wheels.

3. The combination with a vehicle running-gear, comprising two independent wheels at opposite ends of the vehicle, of an engine mounted between the front and rear wheels, a driving-disk on each end of the engine-shaft, a driven disk in edge-to-face relation to each driving-disk, the two driven disks being arranged on opposite sides of the axis of the driving-disks, means for simultaneously moving the driven disks in opposite directions across the faces of the driving-disks, and like connections between the two driven disks and the respective traction-wheels.

4. In combination with a vehicle running-gear, comprising two independent driving-wheels at opposite ends of the vehicle, an engine mounted between the front and rear wheels, a driving-disk on each end of the engine-shaft, a driven disk in edge-to-face relation to each driving-disk, a shaft for each driven disk movable toward and from the surface of the driving-disk, a tumble-shaft connected with each driven disk-shaft, and like connections between the tumble-shafts and their respective traction-wheels.

5. In combination, a bodily-stationary friction-disk, a bodily-movable friction-disk adapted to coact therewith, and means for supporting and moving said friction-disk comprising a rocking frame carrying the movable disk, a rotatable shaft, a cable associated with said shaft to be pulled by the rotation thereof, and connected with the rocking frame in one direction and means for moving said frame in the opposite direction.

In testimony that I claim the foregoing as my own I affix my signature in presence of two witnesses.

PERCY H. BATTEN.

In presence of—
Forée Bain,
Mary F. Allen.